June 3, 1958          S. J. MEDERER          2,837,634
AUTOMATIC NOISE REGULATION FOR RADAR RECEIVERS
Filed Sept. 30, 1953
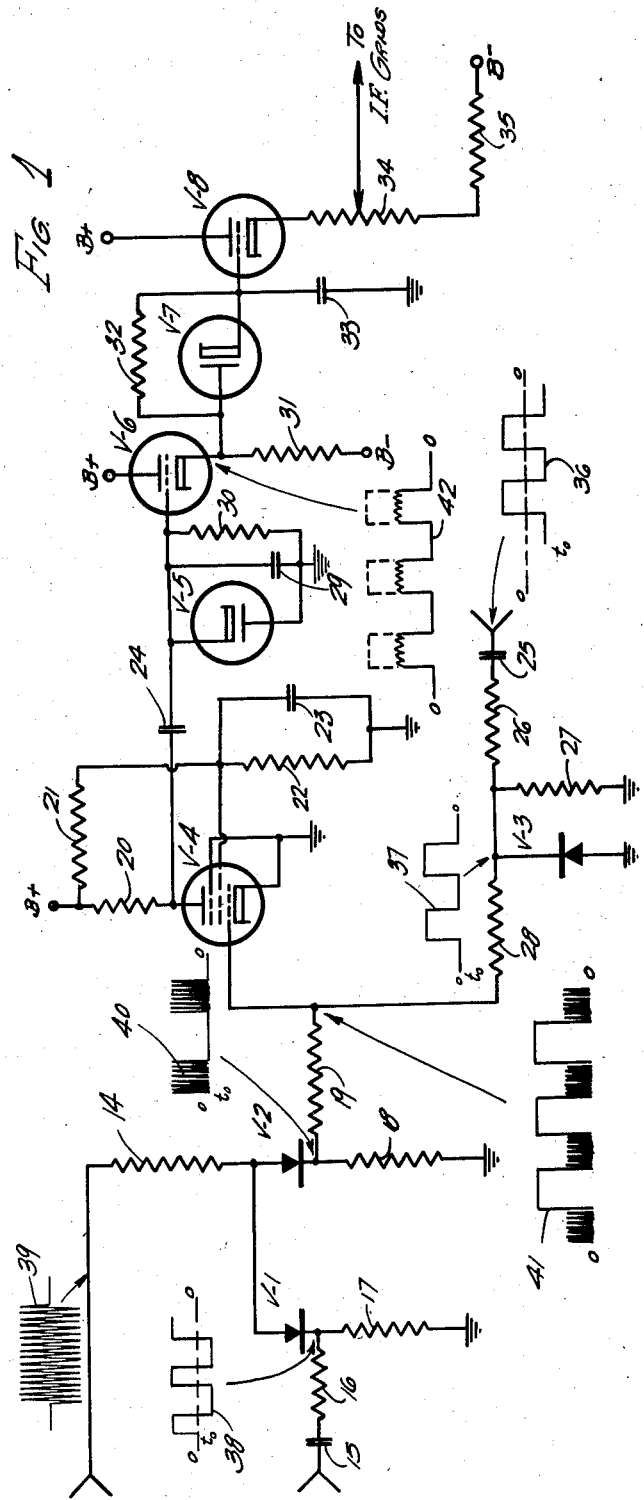
INVENTOR.
STANLIS J. MEDERER

United States Patent Office 2,837,634
Patented June 3, 1958

2,837,634

AUTOMATIC NOISE REGULATION FOR RADAR RECEIVERS

Stanis J. Mederer, Baltimore, Md., assignor, by mesne assignments, to the United States of America as represented by the Secretary of the Navy Application September 30, 1953, Serial No. 383,425

4 Claims. (Cl. 250—20)

This invention relates to automatic sensitivity control of a receiver and is especially intended for use, prior to the selection of a target, on a radar receiver using delayed automatic volume control.

In the radar receivers of the type on which this circuit is used, a target is selected and the radar made to track or follow this target in accordance with range information determined by a range sensing circuit. The range sensing circuit is sensitive to variations in energy and amplitude of the target signals and from these variations it computes range data for the radar. The efficiency of the range circuit is destroyed or greatly impaired when it is presented with extraneous signals such as receiver noise, clutter or noise type jamming, atmospheric reflections and other distributed type returns and as a result the range information is inaccurate.

The present method of providing a delayed automatic volume control voltage for a selected target only above a given signal strength is ineffective to protect against the harmful influence of the aforementioned extraneous signals.

A more realistic approach and one which will effectively destroy the effect of these interfering signals is that of the instant invention which regulates the overall gain of the receiver with reference to a preassigned level.

Since the gain of a receiver depends upon several factors including power supply voltages, temperature variations in the RF and IF plumbing and other variables in the circuitry, it is necessary to measure the apparent overall gain of the receiving system to determine the required degree of regulation.

In the present invention the amplitude of the extraneous signal is determined by comparing it, after amplification in the receiver, with a reference level voltage, the actual measurement being accomplished by taking the difference between the reference and the amplified extraneous signal. The voltage resulting from this measurement is integrated and applied as a biasing voltage to control the receiver sensitivity.

It is an object of this invention to control radar receiver operation so that confusion of extraneous signals with selected target signals is avoided.

It is another object of the invention to control the sensitivity of a receiver according to some preassigned level rather than according to signal amplitude.

Another object of the invention is the provision of means to regulate receiver sensitivity as a function of the level of extraneous distributed received signals thereby minimizing the effect of receiver noise, jamming, atmospheric reflections and other interfering distributed type returns.

Still another object of the invention lies in the effective elimination of the harmful influence of extraneous distributed type signals in a radar receiver with a minimum of added circuitry and components.

A further object lies in employing a small proportion of the output of a multvibrator as a reference voltage to control the degree of gain control applied to the receiver, thereby avoiding large deviations of the reference due to variations in multivibrator operation.

Other objects and many of the attendant advantages of this invention will be readily appreciated as the same becomes better understood by reference to the following detailed description when considered in connection with the accompanying drawings wherein:

Figure 1 is a schematic diagram of the circuit utilized to accomplish the purpose of this invention showing the voltage waveforms introduced and developed at various points in the circuit; and Figure 2 shows schematically the hypothetical relationship between the reference voltage, a received target pulse and an extraneous distributed signal.

Looking now at Figure 2, the numeral 10 designates the reference level voltage supplied by a multivibrator and 11 indicates the integrated extraneous distributed signal. The pulse 12 represents a selected received target and the amplitude difference between the reference level and the extraneous signal is identified by the numeral 13.

The circuit includes a receiver video input network and a reference input network. The receiver video input is gated through a pair of crystal diodes V–1 and V–2 connected in parallel and each having a series resistor 17 and 18 respectively connecting their cathodes to ground. The receiver video is applied to the anodes of said diodes through a resistor 14 and a gating voltage is applied to the anode of V–1 through coupling capacitor 15 and resistor 16. The reference voltage is applied to the cathode of a crystal diode V–3 through coupling capacitor 25 and resistor 26 and a coupling resistor 28 connects the cathode of V–3 to the control grid of an amplifier V–4. The diode V–3 is shunted by a resistor 27. The cathode of V–2 is also coupled to the grid of V–4 by a resistor 19 so that the signal appearing at said grid includes the reference voltage and the gated receiver video. The resistance values in the input circuits are chosen to provide low impedance shunt paths for each crystal to thereby minimize the effect of crystal variations due to ambient temperature changes.

The amplifier includes plate voltage resistor 20, screen voltage resistor 21 and the screen bypass filter comprising resistor 22 and capacitor 23. The amplified output of V–4 is applied through coupling capacitor 24 to integrating and peaking circuits now to be described.

The measurement 13 is made in a peak reading diode circuit which comprises the diode V–5 connected in parallel with capacitor 29 and resistor 30. The plate of V–5 is grounded and the signal is applied to its cathode. The voltage appearing at the cathode of V–5 is applied to the grid of a cathode follower triode V–6 and the voltage appearing at the cathode resistor 31 of the cathode follower is applied to a peak reading circuit composed of resistor 32 and capacitor 33. A diode V–7 shunts the resistor 32 and provides a low impedance charging path for the peak reading capacitor. The voltage across capacitor 33 is fed to the grid of a cathode follower V–8 and the bias voltage is taken from the tap on a potentiometer 34 which with resistor 35 composes the cathode resistance of V–8.

The manner of operation of the above described circuit will now be explained.

The reference and gating voltages are taken from the same multivibrator source and for the sake of simplicity, the output of an existing multivibrator may be employed in cases where the sensitivity control is applied to a radar system. The reference level is derived by taking a relatively small proportion of the multivibrator output, for example, about three one-hundredths thereof, and applying it to the reference input diode V–3. By utilizing only a small proportionate amplitude of the multivibrator output 36, the reference voltage 37 remains substantially constant in spite of variations which may occur in the operation of the multivibrator.

The same multivibrator output voltage is applied to the cathode of the crystal diode V-1 as a gating voltage 38 and the receiver output, comprising mainly extraneous distributed signals 39 when there is no target response, is applied to the anode of V-2. On negative portions of the gate voltage, the crystal diode V-1 will conduct driving the anodes of V-1 and V-2 negative so that the signal voltage 39 is incapable of causing V-2 to conduct. On the positive half cycles of the gate voltage, however, V-1 remains cut off and V-2 conducts on the positive portions of the voltage 39 producing the waveform 40.

The voltage 40 is added to the voltage 37 to produce the composite waveform 41 appearing at the control grid of V-4. The voltage 41 is amplified and applied to the integrating circuit of V-5. As the plate of tube V-4 becomes more positive and oscillates at the frequency of the received electromagnetic signal, the potential across capacitor 29 collects a positive charge which represents the amplitude of the various received signals. When the plate of tube V-4 then becomes less positive during the square wave reference pulse portion of the inverted composite wave 41, capacitor 29 discharges through condenser 24 and the plate circuit of tube V-4. Normally the negative going reference pulse does not quite fully discharge capacitor 29 to drive the grid of tube V-6 negative. Even if it did diode V-5 is provided to clamp the grid of tube V-6 to ground. The potential across capacitor 29 is then used to control current flow through the plate circuit of cathode follower V-6. The output of the cathode follower is then peak detected across capacitor 33 and fed through the cathode follower V-8 back to the intermediate frequency amplifier grid circuits of the receiver where the desired A. V. C. is effected.

Although this system has been described with reference to its use in a radar receiver, it is obvious that it can be used as a noise level control and automatic volume control in any receiver or amplifier adapted to such control.

Obviously many modifications and variations of the present invention are possible in the light of the above teachings. It is therefore to be understood that within the scope of the appended claims the invention may be practiced otherwise than as specifically described.

What is claimed is:

1. An automatic volume control system comprising means for receiving an electromagnetic signal; a gate circuit for alternately rendering the electromagnetic signal receiving means effective; a square wave reference source; means for superimposing the gated output of the signal receiving means upon the output of the reference source such that a composite wave having the gated electromagnetic signal interposed between alternate pulses of the square wave reference source is provided; an integrating circuit; means responsive to the average potential of the electromagnetic signal portion of the composite wave for charging the integrating circuit; means responsive to the square wave portion of the composite wave for discharging the integrating circuit; and means utilizing the output of the integrating circuit as an automatic volume control voltage.

2. An automatic volume control system comprising means for receiving an electromagnetic signal; a gate circuit for alternately rendering the electromagnetic signal receiving means effective; a square wave reference source; means for superimposing the gated output of the signal receiving means upon the output of the reference source such that a composite wave having the gated electromagnetic signal interposed between alternate pulses of the square wave reference source is provided; a resistor; a condenser; means connecting the said resistor and condenser in parallel to form an integrating circuit; means responsive to the average potential of the electromagnetic signal portion of the composite wave for charging the said condenser; means responsive to the square wave portion of the composite wave for discharging the said condenser; and means utilizing the potential across the said condenser as an automatic volume control voltage.

3. An automatic volume control system comprising means for receiving an electromagnetic signal; a gate circuit for alternately rendering the electromagnetic signal receiving means effective; a square wave reference source; means for superimposing the gated output of the signal receiving means upon the output of the reference source such that a composite wave having the gated electromagnetic signal interposed between alternate pulses of the square wave reference source is provided; an integrating circuit; means responsive to the average potential of the electromagnetic signal portion of the composite wave for charging the integrating circuit; means responsive to the square wave portion of the composite wave for discharging the integrating circuit; means for peak detecting the charge collected by the integrating circuit; and means utilizing the output of the peak detecting circuit as an automatic volume control voltage.

4. An automatic volume control system comprising means for receiving an electromagnetic signal; a gate circuit for alternately rendering the electromagnetic signal receiving means effective; a square wave reference source; means for superimposing the gated output of the signal receiving means upon the output of the reference source such that a composite wave having the gated electromagnetic signal interposed between alternate pulses of the square wave reference source is provided; a resistor; a condenser; means connecting the said resistor and condenser in parallel to form an integrating circuit; means responsive to the average potential of the electromagnetic signal portion of the composite wave for charging the said condenser; means responsive to the square wave portion of the composite wave for discharging the said condenser; means for peak detecting the charge across the said condenser; and means utilizing the output of the peak detecting circuit.

References Cited in the file of this patent

UNITED STATES PATENTS

| | | |
|---|---|---|
| 2,426,182 | Lange | Aug. 26, 1947 |
| 2,451,632 | Oliver | Oct. 19, 1948 |
| 2,562,309 | Frederick et al. | July 31, 1951 |